(12) United States Patent
Earp

(10) Patent No.: US 8,944,092 B2
(45) Date of Patent: Feb. 3, 2015

(54) EFFLUENT CONTAINMENT DEVICE

(76) Inventor: Danny Earp, La Porte, TX (US)

( * ) Notice: Subject to any disclaimer, the term of this patent is extended or adjusted under 35 U.S.C. 154(b) by 0 days.

(21) Appl. No.: 12/274,308

(22) Filed: Nov. 19, 2008

(65) Prior Publication Data

US 2009/0126803 A1     May 21, 2009

Related U.S. Application Data

(60) Provisional application No. 60/989,377, filed on Nov. 20, 2007.

(51) Int. Cl.

| F16L 55/168 | (2006.01) |
|---|---|
| F16L 55/07 | (2006.01) |
| B08B 17/00 | (2006.01) |
| B08B 17/02 | (2006.01) |

(52) U.S. Cl.
CPC ............... *F16L 55/07* (2013.01); *B08B 17/00* (2013.01); *B08B 17/025* (2013.01)
USPC ............................................ 137/313; 138/99

(58) Field of Classification Search
CPC ..... B65D 90/24; B67D 7/3209; F16L 55/168; F16L 55/16; F16K 27/12
USPC ................. 137/312, 313, 375; 138/98, 99
See application file for complete search history.

(56) References Cited

U.S. PATENT DOCUMENTS

| 4,207,918 | A | * | 6/1980 | Burns et al. ............... 137/375 |
|---|---|---|---|---|
| 4,274,526 | A | * | 6/1981 | Sims ....................... 193/25 B |
| 4,448,218 | A | * | 5/1984 | Vetter ........................ 138/99 |
| 4,556,082 | A | * | 12/1985 | Riley et al. ............... 137/375 |
| 4,802,509 | A | | 2/1989 | Brandolf |
| 4,930,543 | A | * | 6/1990 | Zuiches ..................... 137/375 |
| 5,377,241 | A | | 12/1994 | Kazirskis et al. |
| 5,490,742 | A | | 2/1996 | Cronk |
| 6,102,076 | A | * | 8/2000 | Romero et al. ........... 138/96 R |
| 6,164,345 | A | * | 12/2000 | Haddox ..................... 137/312 |
| 6,164,824 | A | | 12/2000 | McGlew et al. |
| 7,086,422 | B2 | * | 8/2006 | Huber et al. ............... 138/149 |
| 7,604,017 | B2 | * | 10/2009 | O'Hara ..................... 137/312 |

* cited by examiner

*Primary Examiner* — Kevin Lee
(74) *Attorney, Agent, or Firm* — Baker & Hostetler LLP

(57) ABSTRACT

Disclosed is a disposable drain device for containing seepage from a pipe-joint coupling as the coupling is broken open. The drain device has a wrap member made of a sheet material sufficiently pliant to be wrapped around the circumference of the pipe-joint coupling and resistant to the seepage composition. A drain means is disposed on the wrap member, having a drain port passing through the surfaces of the wrap member and a drain neck. The drain neck is disposed to direct seepage out of the installed wrap member. After use, the drain device can be disposed of as solid waste, rather than needing to be cleaned if the seepage was a hazardous material. The drain device being "disposable" allows the avoidance of creating an additional hazardous waste stream.

22 Claims, 3 Drawing Sheets

EFFLUENT CONTAINMENT DEVICE

The present application claims the benefit of prior filed U.S. Provisional Patent Application Ser. No. 60/989,377, filed 20 Nov. 2007, to which the present application is a regular U.S. national application.

FIELD OF THE INVENTION

The present invention is in the field of apparatuses for containment of effluent from conduits. More specifically, the present invention relates to a transportable device for collecting effluent from conduits when the conduit couplings or flanges are separated.

BACKGROUND OF THE INVENTION

In the petrochemical and other industries, it is necessary at certain times to disassemble pipe-joint couplings. When this occurs, a material (typically a fluid) seeps or spills from the pipe-joint coupling as the coupling is disassembled. A typical method to collect this discharge from the uncoupled pipe-joint has been to allow the discharge material to drain into a bucket or other container under the disassembled coupling. However, because this discharge can be contaminated with toxic materials, this method of disassembly and collection of material can be hazardous and further requires not only disposal of the discharge, but cleaning of the collection containers. It would be useful to have a means to contain the fluid which seeps or spills from a pipe-joint coupling before collection. It would be further useful to be able to dispose of the collection device as solid waste, rather cleaning the device—which creates an additional waste stream of cleaning effluent if the seepage was a hazardous material. Therefore, the drain device being "disposable" is a feature of the present invention that allows the avoidance of creating an additional hazardous waste stream.

SUMMARY OF THE INVENTION

The present invention is a disposable drain device intended for use as a means to constrain a material (typically a fluid) that seeps or spills from a pipe-joint coupling as the coupling is disassembled. The material that seeps from the pipe-joint coupling as the coupling components are separated is constrained within the interior space of the drain device and directed to a drain means to allow the seepage to be cleanly collected (i.e., without spillage into the environment, or excessive atomization) in an appropriate waste container. This is important, because it allows the present disposable drain device to be practiced on pipe-joint couplings of conduits that contain hazardous materials, for which materials the exposure to and the disposal of are regulated by one or more governmental agencies. Additionally, after use, the present drain device can be disposed of as solid waste, rather than needing to be cleaned—which creates an additional waste stream of the cleaning effluent if the seepage was a hazardous material. Therefore, the drain device being "disposable" is a feature of the present invention that allows the avoidance of creating an additional hazardous waste stream.

The drain device has two closure mechanisms which seal the wrap member against the conduit on either side of the pipe-joint coupling: an axial closure mechanism and a radial closure mechanism. The axial closure mechanism is adapted to close the axial edge of the wrap member against a surface of the wrap member when the wrap member is installed over the pipe-joint coupling. The radial closure mechanism seals the installed wrap member proximate each circumferential edge against an outer conduit surface on each side of the pipe-joint coupling. This creates a seepage containment space within the drainage device. The interior containment space holds the seepage material that runs out of the pipe/conduit as the parts of the coupling are separated. The seepage material is removed from the containment space by a drain means.

The drain means is disposed on the wrap member, allowing seepage material collected in the containment space to be eliminated by the force of gravity. Seepage from the conduit can be accumulated in the interior space of the drain device or removed continuously. The center of the drain means is disposed proximate the middle portion of the wrap member. The drain means has a drain port passing through the surfaces of the wrap member. Preferentially, the drain means also has a drain neck in flow communication with the drain port, with an inlet portion and an outlet portion. The drain port directly connects to the inlet of the drain neck. The drain neck is adapted to direct seepage material out of the installed wrap member and facilitates transferring it to another vessel (not shown) for disposal. The drain neck not only serves to allow a user to more readily direct the seepage material effluent into the other vessel (for disposal), but can also serve to enhance the effect of gravity depending on the relative length of the drain neck.

DESCRIPTION OF THE INVENTION

Figure 1A:
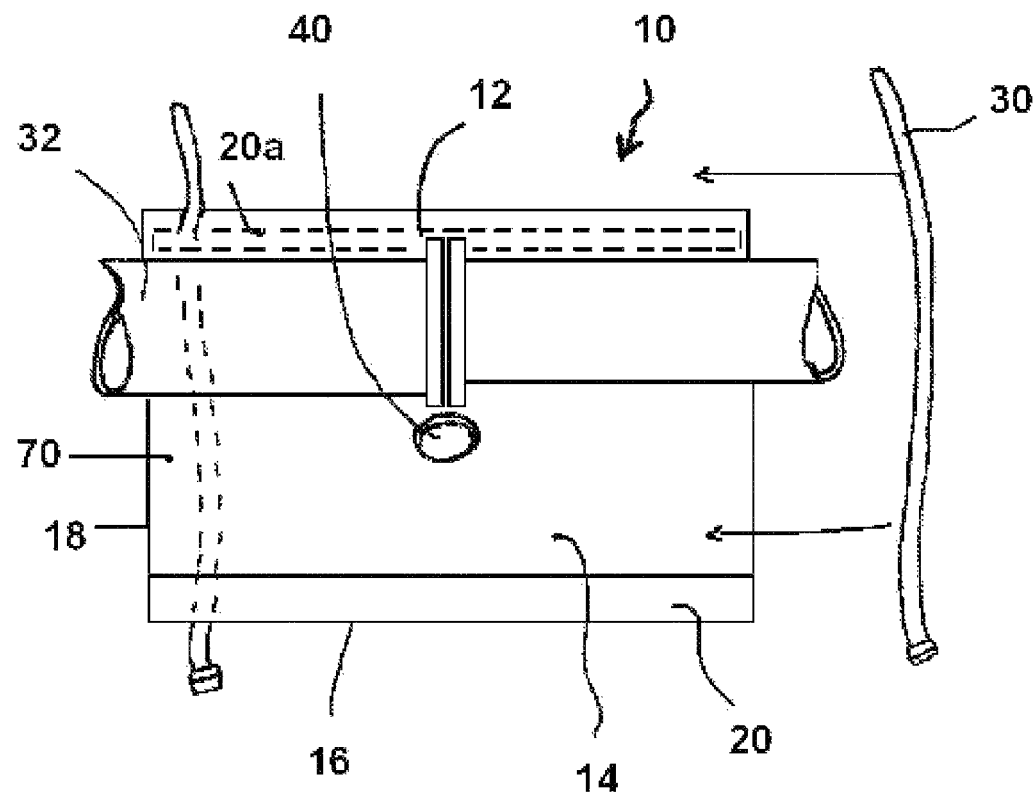
FIG. 1A is a perspective view of the drain device and pipe-joint coupling.

The present invention is a disposable device for containing and directing the outflow or seepage of the contents of a conduit, such as a pipe, which is discharged from a pipe-joint coupling when the coupling components (e.g., coupling flanges) are separated. Referring now to the drawings, the details of preferred embodiments of the present invention are graphically and schematically illustrated. Like elements in the drawings are represented by like numbers, and any similar elements are represented by like numbers with a different lower case letter suffix.

As illustrated in FIG. 1A, the disposable drain device 10 of the present invention is intended for use as a means to constrain the material (typically a fluid) that seeps or spills from a pipe-joint coupling 12 as the coupling 12 is disassembled. The appropriate types of pipe-joint couplings 12 on which the present disposable drain device 10 is intended to be practiced are selectable by one of ordinary skill in the art in view of the teachings and figures herein. The material that seeps from the pipe-joint coupling 12 as the coupling components Fare separated is constrained within the interior space of the drain device and directed to a drain means to allow the seepage to be cleanly collected (i.e., without spillage into the environment, or excessive atomization) in an appropriate waste container. This is important, because it is anticipated that the present disposable drain device 10 will be practiced on pipe-joint couplings 12 of conduits 38 that contain hazardous materials, for which materials the exposure to and the disposal of are regulated by one or more governmental agencies. Additionally, after use, the present drain device 10 can be disposed of as solid waste, rather than needing to be cleaned—which creates an additional waste stream of the cleaning effluent if the seepage was a hazardous material. Therefore, the drain device being "disposable" is a feature of the present invention that allows the avoidance of creating an additional hazardous waste stream.

Figure 1B:
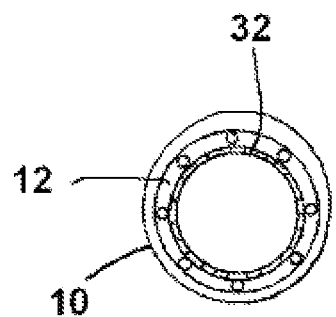
FIG. 1B is a cross-sectional view of the pipe-joint coupling wrapped in the drain device.

The drain device 10 comprises a pipe wrap member 14 and closure mechanisms 20, 30 that allow the device 10 to be installed around a pipe-joint coupling 12 and sealed against the pipe 32 on either side of the coupling 12. See FIG. 1B. The wrap member 14 is made of a pliant sheet material. Typically, the pliant sheet of the wrap member 14 has a substantially rectangular shape with opposed axial edges 16 and opposed circumferential edges 18. Alternatively, the wrap member 14 can have the two axial edges which are substantially parallel to each other, or can have the two circumferential edges substantially parallel to each other. The sheet material is selected to be of a composition sufficiently proof against leakage when exposed to the seepage material and sufficiently pliant to be wrapped around the outer surface (circumference) of the pipe-joint coupling 12 and conduit 38. In a preferred embodiment, the wrap member 14 is a pliant sheet of a flexible material which is waterproof. Preferably, the sheeting material is a flexible reinforced, polymer coated fabric. The sheet material should be resistant to the expected composition of the content of the conduit 38 which it is intended to constrain. For example, a neoprene coated reinforced fabric is readily available for practice in the present drainage device, is useful for many different seepage composition, and is easily disposed of as a solid waste. Other suitable sheet material compositions are known to and are selectable by one of ordinary skill in the art for practice of the invention for a specific application.

In a preferred embodiment, the present drain device 10 has two closure mechanisms which seal the wrap member 14 against the conduit 32 on either side of the pipe-joint coupling 12: an axial closure mechanism 20 and a radial closure mechanism 30. The axial closure mechanism is adapted to close the axial edge 16 of the wrap member 14 against a surface 70F of the wrap member 14 when the wrap member 14 is installed over the pipe-joint coupling 12. The radial closure mechanism 30 is adapted to seal the installed wrap member 14 proximate each circumferential edge 18 against an outer conduit surface 32 on each side of the pipe-joint coupling 12. This defines a seepage containment space 34 within the drainage device 10. The interior containment space 34 holds the seepage material that runs out of the pipe/conduit 38 as the parts of the coupling 12 are separated. The seepage material is removed from the containment space 34 by a drain means 40.

In a preferred embodiment, the axial closure mechanism 20 is a strip of hook and loop fasteners disposed to close the axial edge 16 against a surface of the wrap member 14 when the wrap member 14 is installed over the pipe-joint coupling 12. Alternatively, the axial closure mechanism 20 can comprise other types of closure means, such as snap fasteners or lacing eyes (or hooks). In a preferred embodiment, the radial closure mechanism 30 comprises a cinch strap 36 adapted to be installed and tightened around the wrap member 14 proximate each circumferential edge 18 to seal the wrap member 14 against the outer surface of the conduit 36 on each side of the pipe-joint coupling 12, see FIG. 1A.

Figure 2:
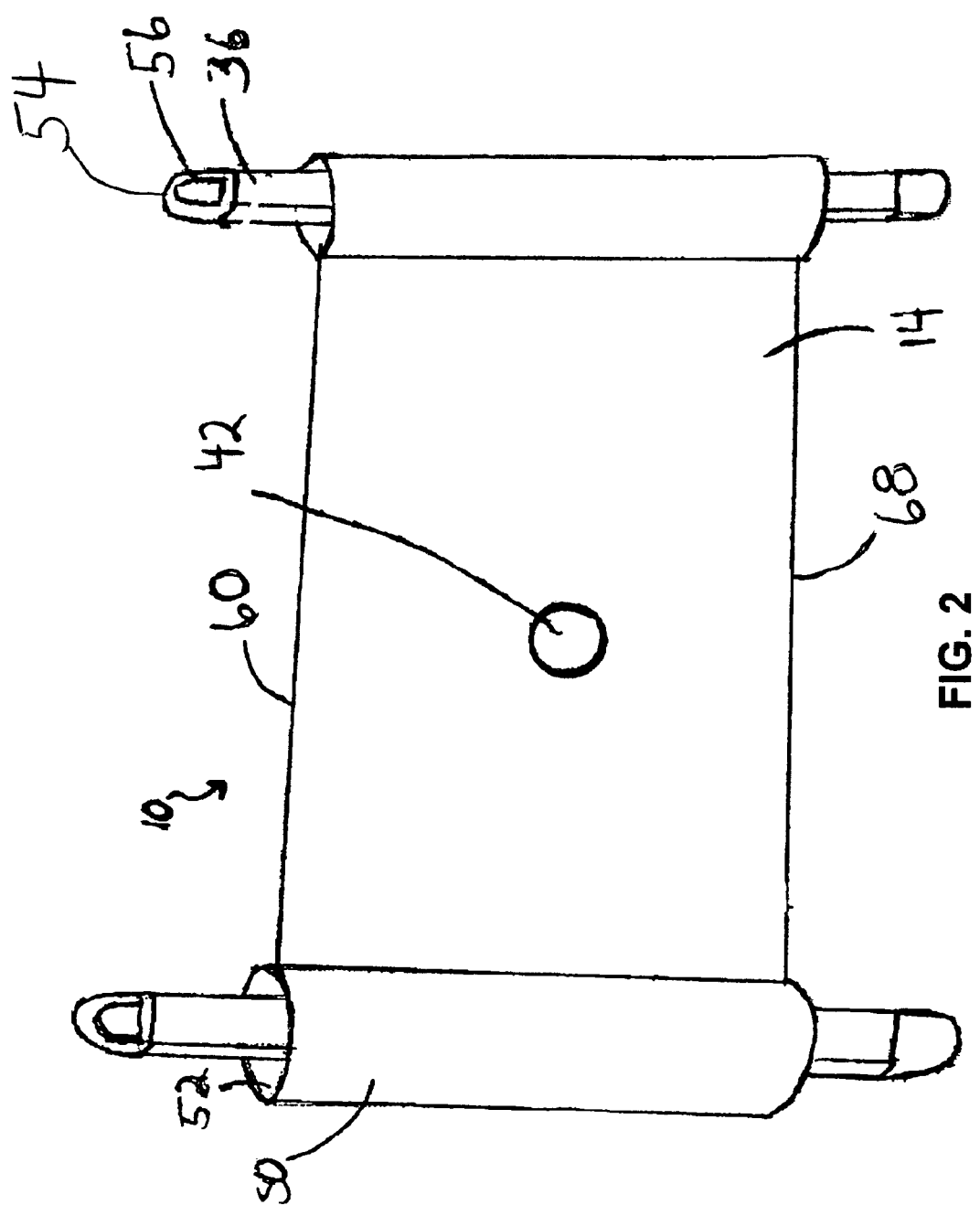
FIG. 2 is a perspective view of representation of the drain device of the present invention.

Alternatively, the radial closure mechanism can be a draw string or cinch strap 36 disposed inside a loop space 52 as shown in FIG. 2. In this embodiment, the pliant sheet material of the wrap member 14 has an first edge 68 and a second edge 60 each defining a loop space 52. The upper end 20 and lower end 18 of the pliant sheet material are folded towards the middle of the wrap member 12 to define a loop space 52. The cinch strap 36 is disposed in and extends from a loop opening 50 of each loop space 52. A fasten means 56, are disposed at strap ends 54 to the cinch strap 36 for securing the ends of the loop element 22 together. The strap ends 54 of the cinch strap 36 are adapted to be drawn together to hold the first and second edges 56, 60 of the wrap member 14 wrapped around the circumference of conduit 38 on either side of the pipe-joint coupling 12. Other types of closure means are known to and selectable by one of skill in the art for practice in the present drain device 10, in view of the general disposability feature of the present invention. Further, it is anticipated that more than one type of closure means may be practiced in accomplishing either the axial 16 or the radial 18 closure mechanisms.

Figure 3:
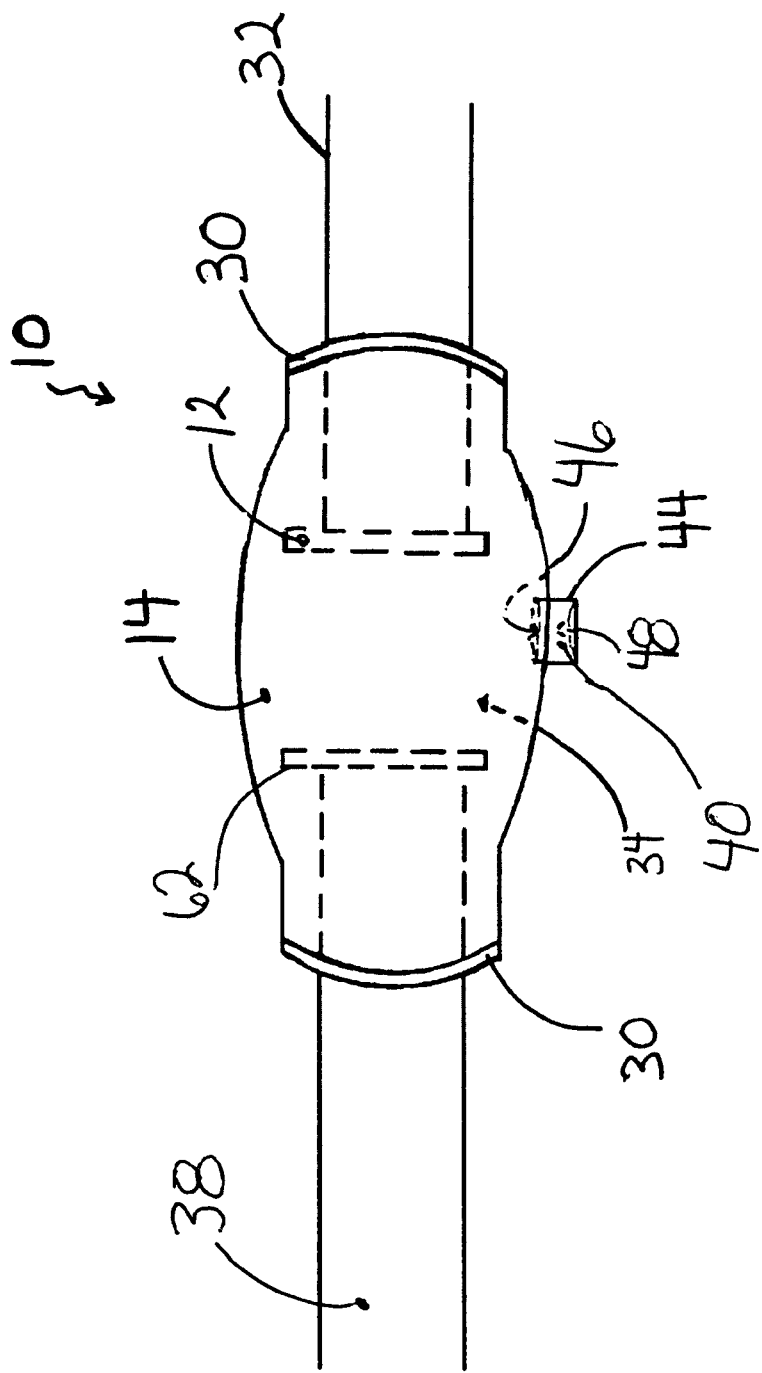
FIG. 3 is a cross sectional view of the drain device installed around an open pipe-joint coupling or flange.

The drain means 40 is disposed on the wrap member 14, preferably in a position to allow seepage material collected in the containment space 34 to be eliminated from the space 34 by the force of gravity. Seepage from the conduit 38 can be accumulated in the interior space of the drain device 10, or removed continuously. In a preferred embodiment, the drain means 40 is disposed proximate the middle portion of the wrap member 14. The drain means 40 has a drain port 42 passing through the surface of the wrap member 14. Preferentially, the drain means 40 also has a drain neck 44 in flow communication with the drain port 42. The drain neck 44 has an inlet 46 portion and an outlet 48 portion. The drain port 42 directly connects to the inlet 46 of the drain neck 44. In a preferred embodiment, the neck inlet 46 has a larger cross-section than the cross-section of an neck outlet 48 of the drain neck 44. An advantage of this configuration is that it give the drain neck 44 a funnel shape and facilitates gravity emptying, as noted below, The drain neck is adapted to direct seepage material out of the installed wrap member 14, and facilitate transferring it to another vessel (not shown) for disposal. The drain neck 44 not only serves to allow a user to more readily direct the seepage material effluent into the other vessel (for disposal), but can also serve to enhance the effect gravity depending on the relative length of the drain neck 44. See FIG. 3.

In using the drain device 10, the wrap member 14 is placed around a coupling/flange 12 on a conduit 38, such a pipe. The upper end 20a and a lower end 20 of the wrap member are brought together to encircle the coupling/flange 12. The circumferential edges 18 are secured to the outer circumference of the conduit 38 on either side of the coupling 12. The pipe-joint coupling 12 may be accessed between the axial edges 16 of the wrap member 14 before they are closed, to enable the user to remove pipe-joint fasteners (not shown) or to separate the flanges 62 of the pipe-joint coupling 12.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A disposable drain device for containing seepage from a pipe-joint flange coupling, the device comprising:
   a wrap member, made of a pliant sheet material, having two parallel axial edges and two parallel circumferential edges that form a rectangle, sufficiently proof against leakage when exposed to the seepage and sufficiently pliant to be wrapped around the circumference of the pipe-joint flange coupling, and configured to contain seepage upon separation of the pipe-joint flange coupling therein;

an axial closure mechanism, extending along the length of one axial edge, configured to close by having a first the axial edge of the wrap member overlap a second axial edge of the wrap member when the wrap member is installed over the pipe-joint flange coupling;

a radial closure mechanism adapted to seal each circumferential edge against an outer pipe surface on each side of the pipe-joint flange coupling to define a seepage containment space; and a drain, disposed on the wrap member, having a drain port passing through the surfaces of the wrap member and a drain neck in flow communication with the drain port, the drain neck disposed to direct seepage out of the installed wrap member.

2. The disposable drain device of claim 1, wherein the wrap member is waterproof and resistant against the expected composition of the seepage it is intended to drain.

3. The disposable drain device of claim 2, wherein the wrap member comprises a flexible, reinforced, polymerized sheet material.

4. The disposable drain device of claim 3, wherein the wrap member comprises a neoprene coated reinforced fabric.

5. The disposable drain device of claim 1, wherein the axial closure mechanism is hook and loop fasteners adapted to close the axial edge against a surface of the wrap member when the wrap member is installed over the pipe-joint coupling.

6. The disposable drain device of claim 1, wherein the axial closure mechanism comprises loop elements in combination with fastening elements to secure the wrap member around the pipe-joint.

7. The disposable drain device of claim 1, wherein the radial closure mechanism comprises a cinch strap adapted to be installed and tightened around the wrap member proximate each circumferential edge to seal the wrap member against the outer pipe surface on each side of the pipe-joint coupling.

8. The disposable drain device of claim 1, wherein the drain is disposed proximate a middle portion of the wrap member.

9. The disposable drain device of claim 1, wherein the drain port of the drain connected to an inlet of the drain neck has a larger cross-section than a cross-section of an outlet of the drain neck.

10. The disposable drain device of claim 1, wherein portions of the axial closure mechanism is located on the first axial edge of the wrap member and the second axial edge of the wrap member.

11. The disposable drain device of claim 10, wherein the axial closure mechanism is configured to close when the closure mechanism on the first axial edge of the wrap member is aligned with the closure mechanism on the second axial edge of the wrap member.

12. The disposable drain device of claim 1, wherein a substantially straight seam is formed by the first axial edge overlapping the second axial edge of the wrap member.

13. The disposal drain device of claim 7, wherein the cinch strap resides in a loop associated with the wrap member.

14. The disposal drain device of claim 13, wherein the loop is formed from the wrap member.

15. The disposable drain device of claim 1, wherein the drain port is located at a lowest portion of the disposable drain device when the disposable drain device is installed around a pipe joint.

16. The disposable drain device of claim 1, wherein the wrap member is contoured to direct flow toward the drain neck.

17. The disposable drain device of claim 1, wherein when the disposable drain device is installed about a pipe joint, the drain neck is located directly below the pipe joint.

18. The disposable drain device of claim 1, wherein the drain port is located at the end of the drain neck.

19. The disposable drain device of claim 1, wherein the radial closure mechanism includes straps that intersect the wrap member at a location spaced way from the axial edges to allow the first axial edge of the wrap member to overlap the second axial edge and be secured by the radial closure mechanism.

20. A disposable drain device for containing seepage from a pipe-joint flange coupling, the device comprising:

a wrap member, made of a pliant sheet material, having two parallel axial edges and two parallel circumferential edges that form a rectangle, sufficiently pliant to be wrapped around the circumference of the pipe-joint flange coupling;

an axial closure mechanism, extending along the length of one axial edge, configured to close the axial edge against a surface of the wrap member when the wrap member is installed over the pipe-joint flange coupling;

a radial closure mechanism including a loop attached to the wrap member and a strap located in the loop configured to tighten thereby closing the wrap member around a pipe, the radial closure mechanism is located to leave an amount of wrap member between the radial closure mechanism and an axial edge to allow one axial edge to overlap a second axial edge to allow the axial closure mechanism to engage; and a drain, disposed on the wrap member, having a drain port passing through the surfaces of the wrap member and a drain neck in flow communication with the drain port, the drain neck disposed to direct seepage out of the installed wrap member, wherein the disposable drain device is configured to contain seepage from the pipe-joint.

21. The disposable drain device of claim 20, wherein the loop is formed by the wrap member being folded over itself.

22. The disposable drain device of claim 20, wherein the drain extends outwardly from the wrap member.

* * * * *